Oct. 14, 1947.  P. VAN S. KOLFF  2,428,882
STEP-BY-STEP MOTOR
Filed June 27, 1945  2 Sheets-Sheet 1

Inventor:
Petrus van Santen Kolff

By
Pierce & Scheffler,
Attorneys.

Oct. 14, 1947. P. VAN S. KOLFF 2,428,882
STEP-BY-STEP MOTOR
Filed June 27, 1945 2 Sheets—Sheet 2

Inventor:
Petrus van Santen Kolff
by Pierce & Scheffler
Attorneys.

Patented Oct. 14, 1947

2,428,882

UNITED STATES PATENT OFFICE 2,428,882

STEP-BY-STEP MOTOR

Petrus van Santen Kolff, Harwich Port, Mass., assignor to The Electric Tachometer Corporation, Philadelphia, Pa., a corporation of Delaware Application June 27, 1945, Serial No. 601,897

9 Claims. (Cl. 172—36)

This invention relates to step-by-step motors, and more particularly to a motor of this type useful for tachometric and like purposes, and having an extremely simple and reliable construction.

An object of this invention is to provide a step-by-step motor utilizing combined electromagnetic and mechanical action to obtain regular stepwise rotation of the motor shaft.

Another object is to provide a motor of this character that is operated by discrete electrical impulses transmitted in a single electric circuit and in which a single electrical impulse serves to advance the armature one step.

Another object is to provide a direct current motor which is compact, powerful and constructed of durable parts, and which provides a very fast and positive step-by-step motion useful in a wide variety of applications.

A further object is to provide, in such a motor, devices by which electric energy is used to impart initial motion to the armature and at the same time to store potential energy in a mechanical driving device, and the stored mechanical energy is used to impart further motion to the armature to complete the operating cycle.

Still further objects and advantages of the invention will be in part apparent and in part pointed out in the following description of a preferred embodiment thereof, as shown in the accompanying drawing, wherein.

Figure 1:
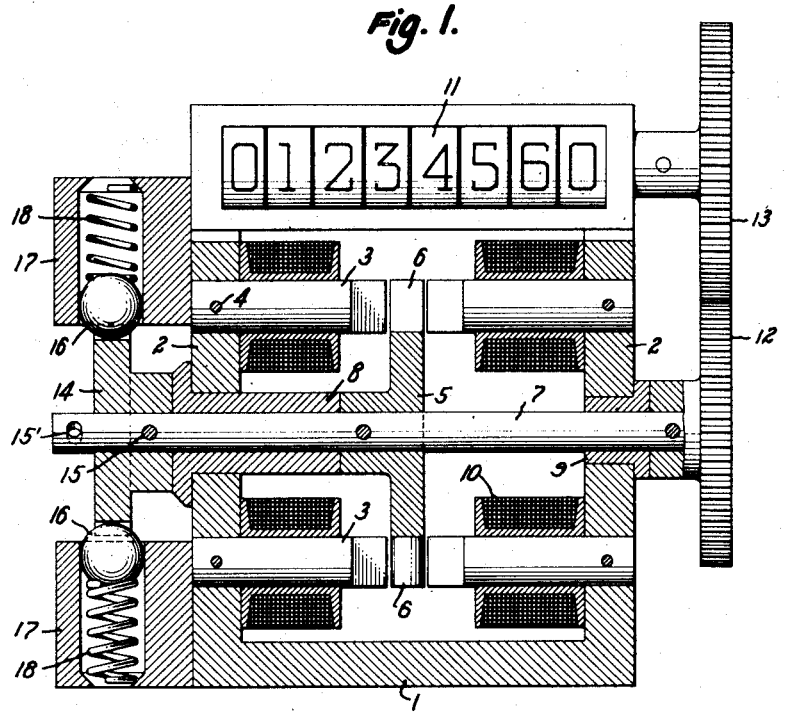
Fig. 1 is a vertical transverse sectional view of a step-by-step motor shown geared to a register for use in counting.
Figure 2:
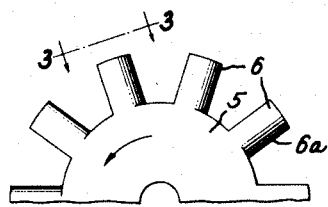
Fig. 2 is a partial right side view of the armature of the motor shown in Fig. 1.
Figure 3:
Fig. 3 is a view taken along the plane of the line 3—3 of Fig. 2, showing one of the polar projections of the armature in end view.

Referring particularly to Figs. 1, 2 and 3, the U-shaped frame of the motor is of iron and includes a base 1 that may be secured to a support in any manner, and side bars 2 in which two sets of axially alined poles 3 are mounted by pins or rivets 4. A soft iron armature 5 with radial extensions or teeth 6 is secured to a shaft 7 that is journalled in bearings 8, 9 mounted in the side bars 2 of the motor frame, the axis of the shaft 7 being parallel to and equally spaced from the axes of the alined pairs of stator poles 3. The armature teeth 6 are of rectangular form, as viewed axially of the shaft, and the ends of the poles 3 are preferably of the same form. It is convenient to use round bar stock for the poles 3 and to mill off the free ends to the desired shape, as indicated by the shading in Fig. 1. The trailing edges of the teeth 6 may be rounded off as shown in Fig. 3 when the motor is to operate in only one direction, but the leading and trailing edges of the teeth are preferably of the same form when the parts are designed for rearrangement to permit rotation in either direction.

Field coils 10 are arranged on the several poles 3 and, as will be explained more fully hereinafter, the armature 5 will be advanced by one step, corresponding to the angular spacing of the armature teeth, by each current pulse to the field coils. There are ten armature teeth in the illustrated recorder embodiment that includes a revolutions counter 11 operated from the shaft 7 through gears 12, 13 having a one-to-one ratio. A different number of armature teeth may of course be employed by an appropriate change in the gear ratio.

A cam 14 is secured to the left-hand end of the shaft 7 by a pin 15, and a pair of followers 16 are mounted in diametrically opposed housings 17 and yieldingly pressed against the peripheral cam surface by springs 18. The followers 16 are preferably steel balls but followers of other shapes may be employed. The cam 14 has the same number of teeth or projections as the armature 5, but neither the depressions 14d between the cam projections nor the tips 14t of the adjacent cam projections are symmetrically disposed with respect to the armature teeth. Furthermore, the low points 14d are not midway between adjacent tips 14t, and these several unsymmetrical relationships result in a step-by-step rotation of the armature 5 and shaft 7 by current pulses transmitted simultaneously to the four field coils 10.

Figure 4:
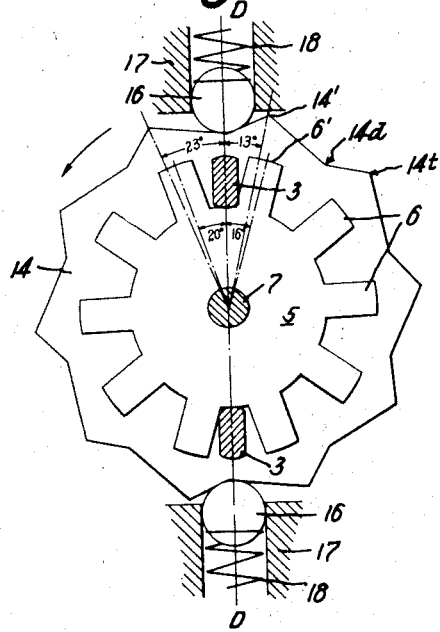
Fig. 4 is a diagrammatic right side view of the armature, cam and cooperating parts in rest position at the end of the cyclic operation of the motor; some of the parts being shown in disproportionate size to facilitate description.

As shown diagrammatically in Fig. 4, the followers or balls 16 are pressed towards each other by their backing springs 18 and they therefore tend to hold the cam 14 at rest with two of the cam low points 14d in the plane D—D that passes through the balls 16, the poles 3 and the shaft 7. The motor is symmetrical about a horizontal plane through the axis of the shaft 7 and, for simplicity, only the parts at the upper half of the motor will be described in detail. The angle between the trailing armature tooth 6' and the plane D—D is somewhat less than p/2, where p is the angular pitch of the teeth, and is somewhat greater than the angle between the trailing tip 14' of the cam 14 and the reference plane D—D. Energization of the coils 10 will set up a magnetic field that draws the trailing armature tooth 6' into alinement with the polar extensions of the upper pair of poles 3, and will therefore move the trailing cam tip 14' beyond the reference plane D—D, see Fig. 5. Potential energy is thereby stored in the springs 18 and is released, upon the interruption of the current through coils 10, to effect the further rotation of the cam 14 that restores the parts to the relative positions shown in Fig. 4.

The angular pitch p is 36° in the case of ten armature teeth, and the trailing tooth 6' may be about 16° from the plane D—D in the rest position of the motor. The effective differential between the torque forces exerted on the trailing tooth 6' and on the adjacent leading tooth to the left of the pole 3 may be increased by relieving the trailing edges of the teeth, as described above, when the motor is to run in only one direction. An appropriate angular spacing of the trailing cam tip 14' from the plane D—D may be 13°, as indicated on Fig. 4, but it is to be understood that these stated values are not critical and may be varied somewhat in accordance with changes in other factors such as the length and magnitude of the current pulses, the magnitude of the load carried by the motor, the strength of the springs 18.

Figure 6:
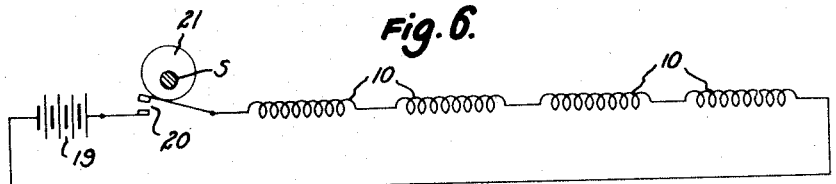
Fig. 6 is a circuit diagram of the motor operatively connected to a source of electric energy.

The circuit connections to the motor are of a simple two-wire type, see Fig. 6, with the several field coils 10 in series with each other and with a source of current 19 and switch 20. The switch 20 may be actuated by a projection or eccentric 21 on a shaft S when the motor is to actuate a counter for registering the number of revolutions of the shaft S.

Figure 5:
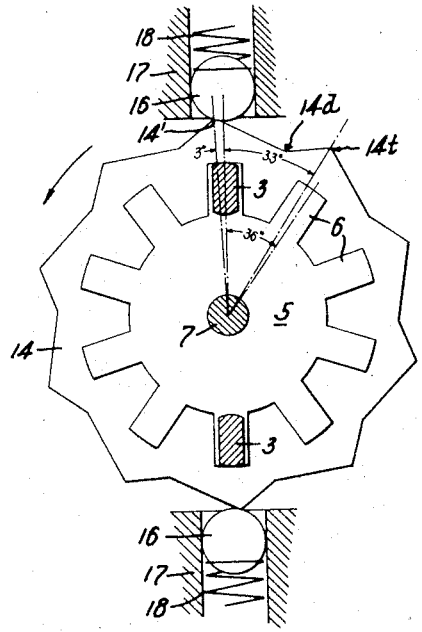
Fig. 5 is a view similar to Fig. 4, but showing the mechanism in an intermediate position in a cyclic stepping operation.
Figure 7:
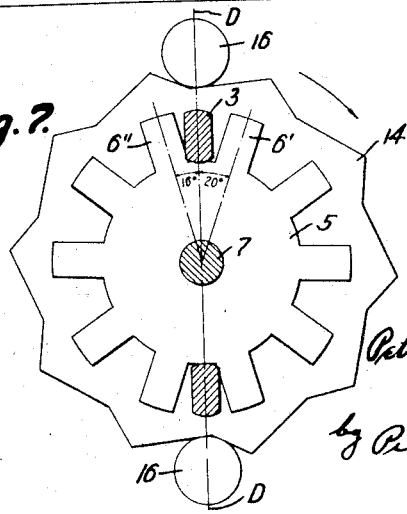
Fig. 7 is a diagrammatic view, similar to Fig. 4, showing the cam reversed for clockwise rotation.

The apparatus as shown in Figs. 4 and 5 is designed for counterclockwise rotation but it will be apparent that the direction of rotation may be changed by removing the cam 14 from shaft 7, turning the cam over, and replacing it upon the shaft. The cam 14 must be displaced angularly with respect to the armature 5 during this operation to shift the "rest" position of the armature 5 clockwise by about 10°, see Fig. 7. The proper angular setting of the cam is obtained by drilling the hole 15' through the outer end of the shaft 7, see Fig. 1, at an angle of about 10° to the inner hole in which the pin 15 is received to secure the cam 14 for rotation in the counterclockwise direction. The armature tooth 6' that was previously the trailing tooth and relatively close to the pole 3 is thus advanced so far that the adjacent tooth 6" at the left will be attracted to the pole 3 upon the next pulse excitation of the coils 10. Another and more readily reversible motor construction may be had by mounting two cams on the shaft 7 and shifting either the cams or the spring pressed followers axially of the shaft to determine the direction of rotation.

The step-by-step motors are more compact, more powerful and more reliable in operation, particularly at high speed, than the known devices that include a plurality of individually and successively energized field windings for effecting a purely electromagnetic advance of the motor armature. Still greater power can be developed in a compact motor by increasing the number of field coils that are simultaneously energized to make a partial advance of the armature and to store mechanical energy for the completion of a one-step advance. When relatively light power is required to carry the load, two of the field coils 10 may be omitted.

It is therefore to be understood that the invention is not limited to the embodiment herein illustrated and described, and that various changes in the general arrangement and in the particular constructions and arrangements of the several parts of the step-by-step motor fall within the spirit of the invention as set forth in the following claims.

I claim:
1. In a step-by-step motor, an armature having a plurality of polar extensions, an electromagnet positioned to attract a polar extension upon energization of the electromagnet, and means mechanically stressed upon movement of a polar extension into proximity to said electromagnet to store potential energy in said means for completing a step advance of the armature to move the polar extension beyond the electromagnet upon de-energization of the same.

2. In a step-by-step motor, the invention as recited in claim 1 wherein said mechanically stressed means includes means for positively limiting the advance of said armature to a single step for each energization of said electromagnet.

3. In a step-by-step motor, the invention as recited in claim 1, wherein said electromagnet includes a pair of spaced pole pieces at opposite sides of the path of the polar extensions of the armature.

4. In a step-by-step motor, the invention as recited in claim 1, wherein said electromagnet includes a pair of pole pieces at opposite sides of the axis of rotation of said armature.

5. A step-by-step motor, characterized by two-stage cyclic operation, comprising a rotatably mounted armature having a plurality of circularly disposed and equally spaced polar projections; an electromagnet fixedly mounted adjacent to the circular path of said polar projections, whereby as a first stage of cyclic operation, energization of the magnet will attract one of said polar projections to a position of proximity with respect to said electromagnet; and mechanical means stressed by said electromagnet to rotate said armature upon de-energization of the electromagnet to bring the next successive polar projection into position to be attracted towards the electromagnet upon re-energization of the electromagnet, whereby to complete the second state of cyclic operation.

6. A step-by-step motor, characterized by two-stage cyclic operation, comprising a rotatable shaft; an armature mounted on said shaft; a plurality of circularly disposed and equally spaced polar projections carried by said armature; an electromagnet fixedly mounted adjacent to the circular path of said polar projections, whereby, as the first stage of cyclic operation, energization of the magnet will attract one of said polar projections to a position of proximity with respect to said electromagnet; a cam mounted on said shaft, said cam having a continuous serrate track, including a number of teeth equal to the number of said polar projections; and a resiliently biased follower riding on said track, said cam being so positioned angularly with respect to said armature that the follower will normally have a stable position on the track between adjacent teeth and one of said polar projections will stand in a position to be attracted to said electromagnet when the latter is energized, and that when the electromagnet is energized and attracts a polar projection the cam is rotated to a position where the follower rests upon an inclined part of the track, whereby, as the second stage of cyclic operation, said follower will rotate the cam to assume its normal position at which the next successive polar projection is in position to be attracted towards said electromagnet upon re-energization of the latter.

7. A step-by-step motor, characterized by two-stage cyclic operation, comprising a rotatable shaft; an armature mounted on said shaft and having a plurality of circularly disposed, equally spaced polar projections; an electromagnet fixedly mounted adjacent to the circular path of said polar projections, whereby, as the first stage of cyclic operation, energization of the electromagnet will attract one of said polar projections to a position of proximity with respect to said electromagnet; a cam mounted on said shaft, said cam having a continuous serrate track including circularly disposed equally spaced teeth equal in number to the number of said polar projections; and a follower, including a spherical element and a spring biasing said element into engagement with said track, said electromagnet, armature, cam and follower being so angularly related that when said spherical element is seated in stable position between two adjacent cam teeth, one polar projection of said armature is in position to be attracted by said electromagnet, and that when said polar projection has been so attracted, said follower element will have ridden over the point of one of said cam teeth and will rest upon an inclined portion of the track in unstable position to complete the second stage of cyclic operation.

8. A step-by-step motor comprising an armature with polar projections, electromagnetic means for attracting said polar projections in succession, and mechanical means for completing a step advance of said armature to displace an attracted polar projection beyond said electromagnetic means upon de-energization of the same; said mechanical means including a cam movable with said armature and having teeth in the same number as the polar projections of said armature, and a spring-pressed follower bearing on said cam to rotate the same and said armature on de-energization of said electromagnetic means, the depressions of the cam being non-symmetrical with respect to the points of the cam and the points of the cam being non-symmetrical with respect to the polar projections of the armature.

9. A step-by-step motor as recited in claim 8, in combination with means for effectively reversing angular asymmetry of said cam with respect to said polar projections to determine the direction of rotation of said motor.

PETRUS van SANTEN KOLFF.

REFERENCES CITED

The following references are of record in the file of this patent:

UNITED STATES PATENTS

| Number | Name | Date |
|---|---|---|
| 882,681 | Hawekotte et al. | Mar. 24, 1908 |
| 1,712,377 | Chirol | May 7, 1929 |